(12) United States Patent
Lindner et al.

(10) Patent No.: US 8,477,080 B2
(45) Date of Patent: Jul. 2, 2013

(54) DEVICE AND METHOD FOR OUTPUTTING DIFFERENT IMAGES ON AT LEAST TWO DISPLAY UNITS

(75) Inventors: Markus Lindner, Stuttgart (DE); Axel Kirschbaum, Muehlacker (DE); Simone Tonte, Korntal-Münchingen (DE)

(73) Assignee: Robert Bosch GmbH, Stuttgart (DE)

( * ) Notice: Subject to any disclaimer, the term of this patent is extended or adjusted under 35 U.S.C. 154(b) by 484 days.

(21) Appl. No.: 12/224,076

(22) PCT Filed: Jan. 11, 2007

(86) PCT No.: PCT/EP2007/050260
§ 371 (c)(1),
(2), (4) Date: Apr. 20, 2010

(87) PCT Pub. No.: WO2007/098974
PCT Pub. Date: Sep. 7, 2007

(65) Prior Publication Data
US 2010/0194666 A1     Aug. 5, 2010

(30) Foreign Application Priority Data

Feb. 27, 2006  (DE) .......................... 10 2006 009 010

(51) Int. Cl.
*G09G 5/00*     (2006.01)
(52) U.S. Cl.
USPC .............. 345/1.2; 345/1.1; 345/204; 348/500

(58) Field of Classification Search
USPC ............ 345/1.1–3.4, 204–213; 348/500–551, 348/E5.009–E5.021
See application file for complete search history.

(56) References Cited

U.S. PATENT DOCUMENTS

| | | | |
|---|---|---|---|
| 6,188,381 B1 * | 2/2001 | van der Wal et al. | 345/581 |
| 6,215,459 B1 * | 4/2001 | Reddy et al. | 345/3.1 |
| 6,870,518 B1 | 3/2005 | Brenner | |
| 7,576,706 B2 * | 8/2009 | Lim et al. | 345/1.3 |
| 8,106,897 B2 * | 1/2012 | Uchida et al. | 345/204 |
| 2003/0103058 A1 * | 6/2003 | Hellen Brown Elliott et al. | 345/589 |
| 2005/0073819 A1 * | 4/2005 | McCubbrey | 361/785 |
| 2005/0090215 A1 * | 4/2005 | Cheng et al. | 455/180.3 |
| 2006/0095617 A1 * | 5/2006 | Hung | 710/69 |

FOREIGN PATENT DOCUMENTS

WO   WO 98/25200   6/1998

* cited by examiner

*Primary Examiner* — Dmitriy Bolotin
(74) *Attorney, Agent, or Firm* — Kenyon & Kenyon LLP

(57) ABSTRACT

A device for outputting different images on at least two display units includes a control unit for reading image data of the different images from an image memory, for producing a horizontal synchronization signal and for outputting the image data and the horizontal synchronization signal. The device also includes a processing unit for receiving the image data and the horizontal synchronization signal, for producing additional synchronization signals respectively for one of the at least two display units as a function of the synchronization signal provided by the control unit and a clock signal, and for dividing the image data transmitted by the control unit in such a way that the image data of the different images are output to one of the display units.

14 Claims, 3 Drawing Sheets

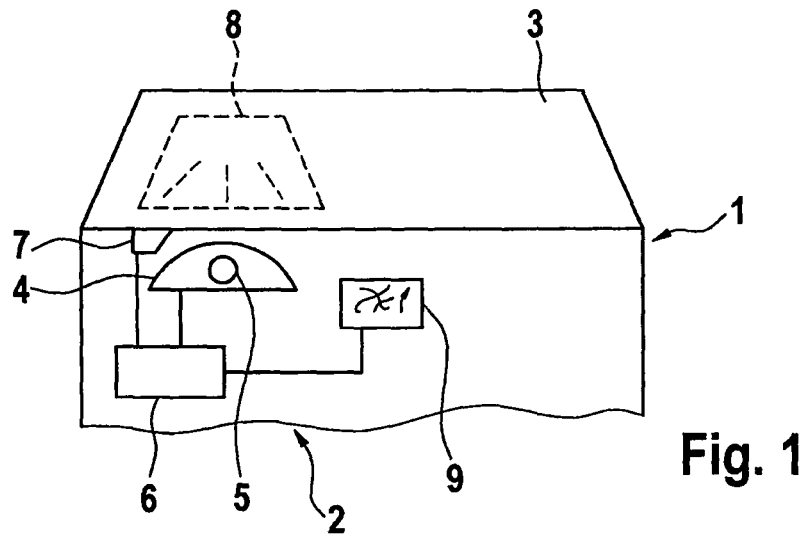
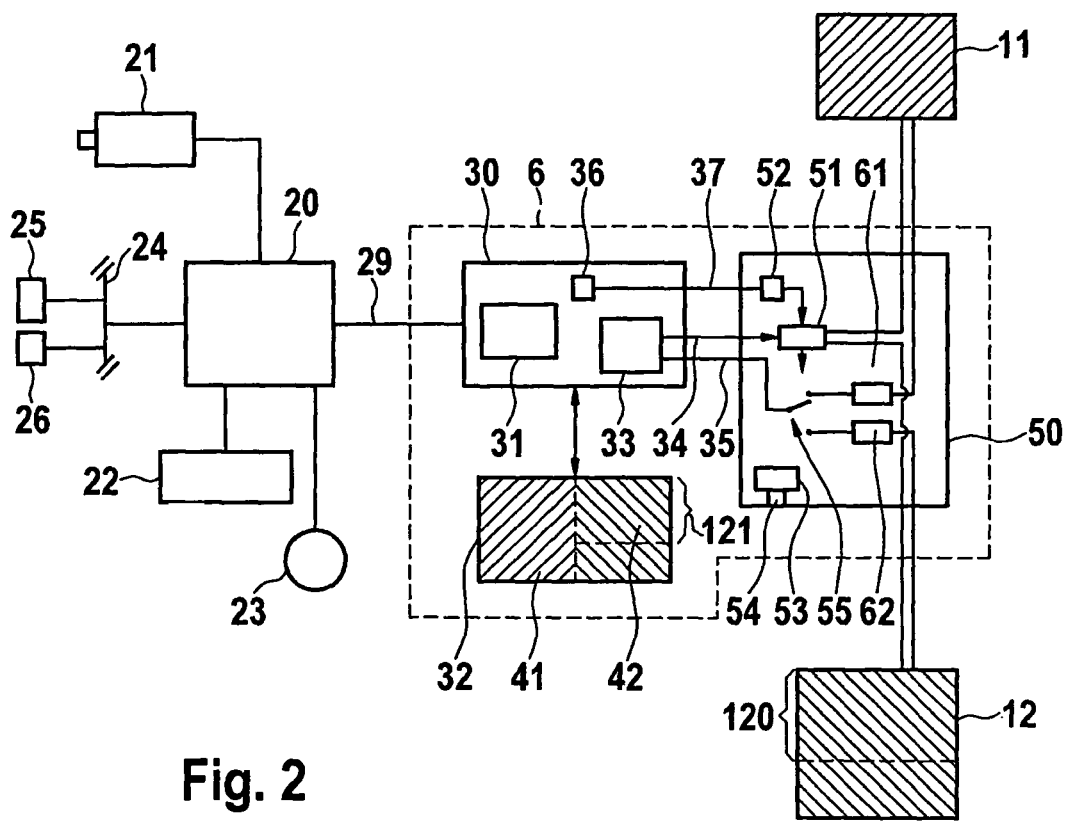
Fig. 1
Fig. 2

DEVICE AND METHOD FOR OUTPUTTING DIFFERENT IMAGES ON AT LEAST TWO DISPLAY UNITS

BACKGROUND OF THE INVENTION

1. Field of the Invention

The present invention is directed to a device and a method for outputting different images on at least two display units.

2. Description of Related Art

U.S. Pat. No. 6,215,459 describes a video control circuit for triggering two display units. Image data are read out of an image memory, the image data being output alternately to a display controller for the first display unit and to a display controller for the second display unit via two circuit units. For the case when the two display units differ in their output rate, first-in-first-out memory units are also provided, in which the transmitted image data may be stored temporarily before being forwarded to the display controllers.

BRIEF SUMMARY OF THE INVENTION

The device according to the present invention for outputting different images on at least two display units has the advantage over the related art that at least two images are generated from a video signal suitable for direct display generation via a suitable processing unit, each of the different images being displayed on a display unit provided for this purpose. Via conversion in the processing unit, it is thus possible to display an image on multiple display units using only one display controller. It is thus possible to reduce the number of display controllers, which are usually rather complex. It is even possible to use one display controller to trigger two display units having different display technologies or different image sizes. Thus, on the whole, this makes it possible to reduce the electronic complexity for displaying different images on multiple display units.

Advantageous refinements and improvement of the device indicated in the independent claim and the method indicated in the additional independent claim are possible through the measures specified in the dependent claims. It is particularly advantageous to initiate a start of an image line made up of a corresponding image line of all the different images through the horizontal synchronization signal. Thus the image line of the multiple different images may be output by the control unit in such a way that the multiple different images may be displayed simultaneously and in proximity in a display unit of suitable size. The different images are therefore transmitted line by line in one form from the control unit to the processing unit as if it were one large common image. This simplifies the interface as well as the data transfer from the control unit to the processing unit.

Furthermore, it is advantageous to store the at least two different images in the image memory next to each other. In this way the images may be read out conveniently and in particular easily line by line.

It is also advantageous to generate the triggering signals for triggering the individual display units in the processing unit. These signals may be generated easily because synchronization signals and clock signals are already being supplied by the control unit to the processing unit and thus it does not necessarily require a new calculation but instead in particular a suitable conversion of these signals for the individual display units is required.

Furthermore, it is advantageous to provide a memory for the processing unit for storing the image data of the different images for the at least two display units. This memory makes it possible in particular to provide image data for output for the particular period of time by transmitting a different image for a different display unit to the processing unit. This makes it possible to transmit image data of the different images on the processing unit line by line one after the other, in particular without interrupting a quasi-continuous image data output from the processing unit to the display unit. This makes it possible to ensure a continuous flicker-free image display on multiple display units. Memory may be implemented in a particularly favorable way by storing up to one image line in each case. On the one hand, a suitable triggering of the image data transfer for continuous image data output to the display units is possible here, while on the other hand the required memory space may be minimized.

It is also advantageous to connect the processing unit to the control unit and/or the display units via an LVDS link (low voltage differential signaling). This allows data transmission between the individual electronic components in a particularly interference-free manner.

It is also advantageous to design the processing unit as an FPGA (field programmable gate array). An FPGA may be designed inexpensively on the one hand while on the other hand it allows almost parallel processing of image data for output to various display units and may also be easily adapted by the manufacturer of the device to the requirements of the image data transmitted by the control unit as well as to the requirements of the display units connected to the processing unit.

It is also advantageous to provide an interface on the processing unit for defining a frequency for output of the image data to at least one of the display units on the processing unit. In this way the device according to the present invention for outputting different images on at least two display units may also be adapted to another display unit connected to the device according to the present invention.

Furthermore, it is advantageous to output the image data from the control unit to the processing unit at a first frequency and, if necessary, to output temporarily stored image data with a lower frequency to the multiple display units. This makes it possible to ensure that in the time during which the image data for multiple different images are transmitted, these different images are output more or less simultaneously to the output units. It is possible in this way to avoid parallel data transmission from the control unit to the processing unit.

Furthermore, it is advantageous to read out successively a corresponding image line from the different images, e.g., first the first line of the first image, then the first line of the second image and next the second line of the first image, etc. The frequencies for output of the image data to the processing unit are preferably each selected in such a way that, for output of one image line of the different images, the approximate time is available during which an image line of all the different images is transmitted to the processing unit. This makes it possible to reduce the memory demand in the processing unit to temporary storage of one image line. Furthermore, there is no interruption in the data flow from the processing unit to the different display units.

BRIEF DESCRIPTION OF THE SEVERAL VIEWS OF THE DRAWING

FIG. 1 shows a device according to the present invention for outputting different images on at least two display units in a motor vehicle.

FIG. 2 shows an exemplary embodiment of a device according to the present invention for outputting different images on two display units in a schematic diagram.

DETAILED DESCRIPTION OF THE INVENTION

Figure 3:
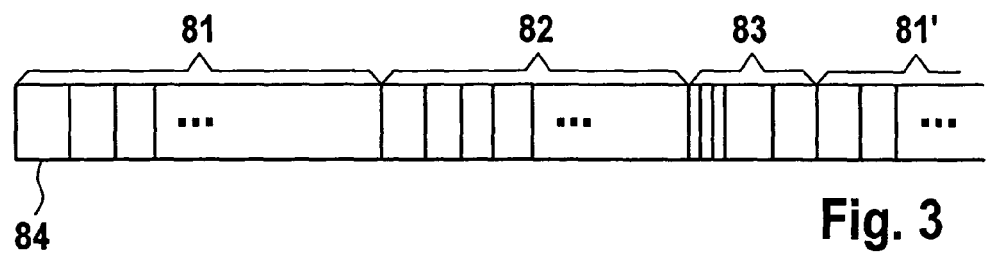
FIG. 3 shows an example of image data including pixel information of different images.

The device according to the present invention may be used for any applications in which different image data are output to different display units. However, use in a motor vehicle is advantageous in particular, because in general only a limited installation space, limited electric power and/or limited computation capacity are/is available in a motor vehicle. The present invention is therefore explained below using the example of application of the device according to the present invention for outputting different images on two display units in a motor vehicle. The images may differ in their image content. This does not prevent the images from having the same content, depending on a desired output. However, different image contents would be possible in principle. The images may be of the same size here, but in another embodiment they may also differ in their image format.

FIG. 1 shows schematically an instrument panel 2 in front of the driver in a motor vehicle 1 below a windshield 3. In instrument panel 2 a combination instrument 4 is provided for display of driving data of vehicle 1. For example, values such as the prevailing driving speed may be displayed in a pointer display 5. Combination instrument 4 has a liquid crystal display as the display unit, in which an image of pointer display 5 is displayed. Combination instrument 4 is connected to a device for outputting images 6. Furthermore, a projection unit 7 for generating a head-up display 8 on windshield 3 and in a preferred specific embodiment also a display unit 9 in an area of a central console of instrument panel 2 are connected to the device for outputting images 6. For example, a night viewing display of a road scene in front of vehicle 1 may be displayed in head-up display 8. For example, navigation aids may be output in central console display unit 9.

The images output by the respective display units are generated in device 6 for output of the images in the manner according to the present invention. The functioning of the device for image output is shown in detail in FIG. 2. One embodiment is shown here, in which two display units, e.g., combination instrument 4 and projection unit 7, are connected to the device for image output.

FIG. 2 shows schematically the device for outputting different images 6 according to the present invention, whereby device 6 itself is differentiated from the other unit connected to it by a dashed line. Thus, a first display unit 11 and a second display unit 12 are connected to the device for outputting different images 6. Furthermore, the device for outputting different images 6 is connected to a computer unit 20. Computer unit 20 determines the image information that is to be output on display units 11 and 12. To do so, computer unit 20 is connected, e.g., to a camera 21, a navigation device 22, a data medium drive 23 and to sensors 25, 26 in the vehicle, preferably via a databus 24.

A video image is recorded by camera 21 and transmitted to computer unit 20. Driving data and/or ambient data of the vehicle are supplied to computer unit 20 by sensors 25, 26 in particular. These data may include, for example, the engine rotational speed, the prevailing vehicle velocity, the tank filling level, the cooling water temperature or the outside temperature. Information about driving instructions to be output is transmitted from navigation device 22 to computer unit 20. In particular image information for output via display units 11, 12 may be output from data medium drive 23.

Image information and corresponding commands for image output are transmitted from computer unit 20 to device 6 for outputting different images and here to control unit 30 via a suitable interface 29. The information transmitted in this way is either only commands for image output or may also be image data but cannot be used further directly without additional processing for triggering one of display units 11, 12, e.g., a TV signal or image data in a compressed data format. For processing, control unit 30 has a graphics processor 31, which processes the raw image data supplied to it and writes image data to be output into an image memory (frame buffer) 32. Image memory 32 is designed in such a way that a first image 41 that is to be displayed in first display unit 11 and a second image 42 that is to be displayed in second display unit 12 are entered jointly into image memory 32. The image data of two images 41, 42 are preferably not mixed in being written to image memory 32 but instead each is stored separately but next to each other in the memory. For outputting the image data of two images 41, 42 to display units 11, 12, the image data are read out of the image memory by a display controller 33 in control unit 30. Images 41, 42 are preferably read out line by line.

Image data 41, 42 are preferably stored in image memory 32 in such a way that they may also be interpreted as one large image accordingly. In line-by-line readout, first the first image line of first image 41 is read out and immediately thereafter the first image line of second image 42 is read out and transmitted to display controller 33. Display controller 33 converts the image data transmitted to it into such electronic signals that may be converted directly into an image by a display unit, e.g., VGA or RGB display signals. Display controller 33 to this end has a second data output 35 which has color conductors, for example, each being assigned to one color bit of the colors red, green and blue. A red, green and blue value is then assigned to each pixel. In this way it is possible to perform 8-bit coding of the color values, for example, so that the color information for a pixel is transmitted over 24 individual conductors forming second data output 35.

To permit horizontal and vertical synchronization of the image in a display unit and to characterize the relevant image data signals, display controller 33 also has a first data output 34 which preferably also has three conductors.

Synchronization signals are transmitted over first data output 34, in particular a vertical synchronization signal for synchronization of the beginning of the image, a horizontal synchronization signal for synchronization of the beginning of the line and a so-called enable signal that characterizes image information output by second data output 35 as useful data for a display unit for the case when this signal is set. The image data are assigned here by display controller 33 to the corresponding color value.

The readout of the image data and the output of the triggering information by display controller 33 are controlled by a working clock which is preselected by a clock generator 36 in control unit 30. This clock pulse is also transmitted to the processing unit 50 over a clock conductor 37 and thus also controls the processing of the transmitted pixel information and synchronization signals.

A display unit may be connected directly to the interface formed by the first and second data outputs 34, 35 and the clock conductor, this display unit being large enough, for example, so that it is able to display both of images 41, 42 side by side on its display surface. The output signal would be suitable for having both images 41, 42 appear side by side on a suitably large display unit if the output trigger signals are coded in such a way that they can be read by the display unit accordingly. No further conversion of the data output by the display controller would be necessary. In practical terms, data for direct generation of a display unit display would then be output by display controller 33, this display corresponding to a side-by-side arrangement of two images 41, 42.

According to the present invention, the image data converted into triggering signals are not, however, output directly to a display unit but instead are sent to a processing unit 50. The synchronization signals output by first data output 34 are forwarded to a computer unit 51 of processing unit 50. In a first embodiment, one operating cycle of processing unit 50 is obtained from the clock pulse of the image signals transmitted. Clock unit 52 generates the processing clock pulse for image output to first display unit 11 and to second display unit 12. In a first embodiment, the frequency of the clock signals is reduced by half by clock generator 36 through clock unit 52 and also shifted in phase if necessary. In another embodiment, different frequencies which are stored in a memory 53 of processing unit 50 may be preselected for first display unit 11 and second display unit 12. Memory 53 is connected to an interface 54. The output parameters for display units 11, 12 are stored in memory 53. If the output parameters are to be altered because another display unit is to be connected to processing unit 50 instead of one of the display units 11 or 12, these altered parameters may be entered into memory 53 via interface 54.

The synchronization signals transmitted by first data output 34 and preferably the unaltered clock signal of clock generator 36 are sent to computer unit 51 of processing unit 50. The pixel information output by second data output 35 is sent to a switch unit 55, which is triggered by computer unit 51. Depending on the setting of switch unit 55, the pixel data output by display controller 33 via second data output 35 are written into a first memory 61 or into a second memory 62. Memories 61, 62 are designed as a dual-ported RAM or as a first-in-first-out memory, for example. First memory 61 is assigned to first display unit 11 and second memory 62 is assigned to second display unit 12. Memories 61, 62 are preferably designed in such a way that they include no more than one image line but at least half an image line of an image, which is displayed in display units 11, 12 assigned to particular memory 61, 62.

The basic operation of the image data output takes place in such a way that an image line including a line of first image 41 and second image 42 is output pixel by pixel by display controller 33. If the horizontal synchronization signal for the particular line has been received in computer unit 51 and if the enable signal is also activated, then computer unit 51 sets switch 55 in such a way that the pixel data output via second data output 35 are written to first memory 61. Computer unit 51 then counts the pixels on the basis of the clock signals output by clock generator 36. The number of pixels per line in first display unit 11 is stored in memory 53. If the number of pixels in a line of first display unit 11 has been transmitted, which may be determined by computer unit 51 on the basis of the number of clock signals received after activation of the enable signal, then the transmission of pixel data to first memory 61 is stopped and switch 55 is switched, in such a way that the next pixel transmitted is already written to second memory 62. Accordingly, the first part of the line, namely the part belonging to first image 41, is written to first memory 61 and the second part of the line, namely the part belonging to second image 42, is written to second memory 62. After computer unit 51 has found that all the pixels of the line of second image 42 have been transmitted, writing of pixels into second memory 62 is interrupted. After arrival of the next horizontal synchronization signal output by display controller 33, the next image line is written to memories 61, 62.

In the meantime, the triggering data transmitted to memory 61 have already been output, so that the corresponding pixel information is forwarded to display units 11, 12 and has produced a display of the pixels of the respective image line accordingly. Output of the pixel information from memories 61, 62 preferably takes place at half the frequency with which the image information is transmitted from control unit 30 to processing unit 50 for display units of the same size. In the time during which the line information about two different images 41, 42 is transmitted per line, the image information of one line is output from memories 61, 62 in parallel processing. This readout operation is explained on the basis of FIGS. 5a, 5b and 5c.

Figure 5A:
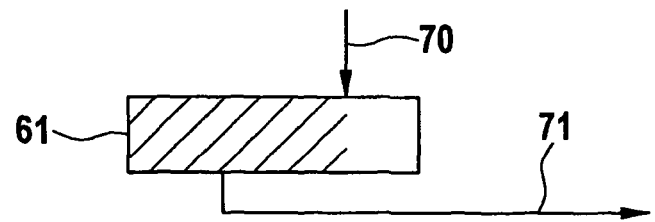
FIGS. 5a, 5b and 5c show an exemplary embodiment of transfer and readout of image data in two memory devices of the processing unit.

FIG. 5a illustrates a state in which, indicated by an arrow 70, approximately 80% of the first image line of first image 41 has been written to first memory 61. In comparison with readout of image data and output to the display units, writing to memory takes place at twice the speed. Therefore, at this point in time only 40% of the information of the first image line of first image 41 has been read out and displayed in display unit 11. This is represented by second arrow 71 in FIG. 5a.

Figure 5B:
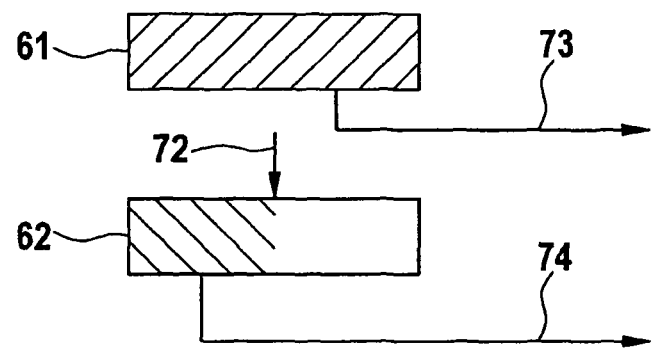

FIG. 5b illustrates the situation at a point in time when not only the first image line of first image 41 but also half of the first image line of second image 42 have been transmitted, the image information of the second image having been written to second memory 62. The status of writing image information is represented by arrow 73. At this point in time, 75% of the image information of the first image line has already been output, as represented by arrow 73. With input of the image information into second memory 62, reading image information out of second memory 62 and display of it in second display unit 12 has also been started. At this point in time, 25% of the image information of the first image line of the second image has already been read out, as indicated by arrow 74.

Figure 5C:
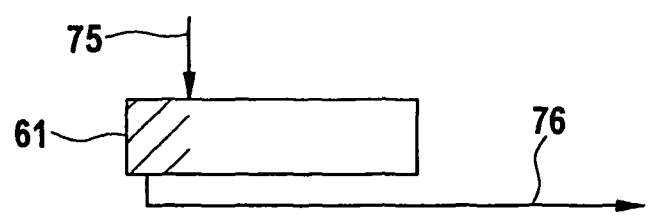
Figure 5C:
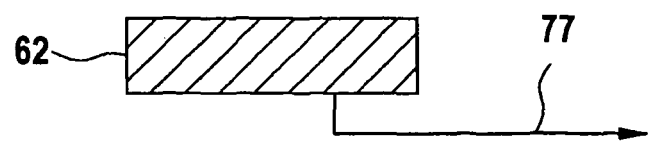

FIG. 5c illustrates the situation at a later point in time, when the first image line of the first and second images has already been transmitted completely and the beginning of the second image line of the first image has already been 20% transmitted and written into first memory 61. The status of the write information is emphasized by arrow 75. The image information of the first line of first image 41 already transmitted may now be overwritten because the first image line has already been output completely. Now the second image line, represented by arrow 76, has already been 10% output. The first image line of second image 42 has been written completely to second memory 62. The first image line of second image 42 has already been 60% output, represented by arrow 77. The image information of first image 41 and second image 42 has thus been output to first and second display units 11, 12, with a time shift of half a line between them, but it is possible to display image data 41, 42 of the different images in display units 11, 12 continuously.

FIG. 3 shows an exemplary embodiment of a pixel signal output by display controller 33 via second data output 35. First color information on the pixels of first image 41 is output, characterized by bracket 81, with individual pixels 84 containing pixel information about the particular line of the first image. Pixel information of second image 42 of the same line, represented by bracket 82, follows this. Before pixel data 81' of the first image is transmitted again, pause data, so-called blanks 83, may be transmitted.

Figure 4:
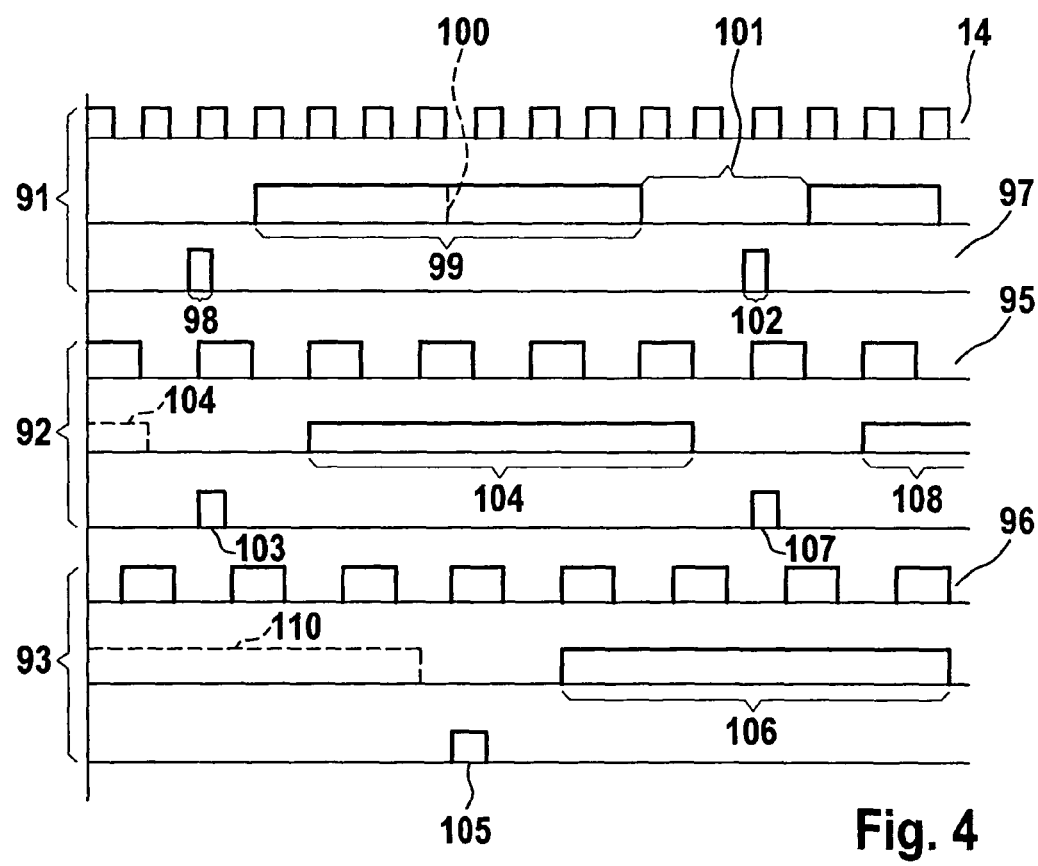
FIG. 4 shows an exemplary embodiment of clock signals and synchronization signals between the control unit and the processing unit on the one hand and between the processing unit and two display units connected to it on the other hand.

FIG. 4 shows an exemplary embodiment of clock signals and synchronization signals over time. A clock signal, an enable signal and a horizontal synchronization signal are shown here. In a first representation, the signals generated by control unit 30 are displayed at the output of display controller 33. In a second representation 92 the signals generated by processing unit 50 are displayed at the output of processing unit 50 to first display unit 11. In a third representation 93, the signals generated by processing unit 50 are displayed at the output of processing unit 50 to second display unit 12.

In first representation 91, clock signal 94 is shown with which the image data is transmitted from control unit 30 to processing unit 50. The clock signals with which the image data are output by processing unit 50 to first display unit 11 and second display unit 12, i.e., clock signals 95, 96 in displays 92 and 93, are generated by clock unit 52 from clock signal 94. These signals have half the frequency in comparison with clock signal 94.

The response of horizontal synchronization signal 97 during period of time 98 initiates the subsequent transmission of image data from control unit 30 to processing unit 50 in representation 91. In subsequent time phase 99 during which the enable signal is set, the image data of one line of first image 41 as well as of second image 42 are transmitted. The separation between image data of first image 41 and of second image 42 is indicated by dashed line 100. The transmission phase is followed by a pause phase 101 during which no image data are transmitted and the enable signal is not set. After a second horizontal synchronization signal pulse 102, the next image line is transmitted.

For output of the image data in first display unit 11, computer unit 51 generates a particular horizontal synchronization signal 103, which is output to first display unit 11. During period of time 104, a corresponding enable signal, which is also generated by computer unit 51 of processing unit 50, is output to first display unit 11. In period of time 104, trigger data for the pixels of the image line are also transmitted to first display unit 11.

Offset by approximately the period of time which corresponds to output of half an image line to first display unit 11, the image data output to second display unit 12 is initiated by a corresponding horizontal synchronization signal 105 output by computer unit 51 to second display unit 12. The image data are transmitted to second display unit 12 during period of time 106, during which the corresponding enable signal is output by computer unit 51 to second display unit 12. Before this transmission is concluded, the transmission of image data by outputting enable signal 108 to first display unit 11 is initiated again by a horizontal synchronization signal 107. A corresponding procedure is followed for transmission of the following image lines.

FIG. 4 shows the transmission of a first image line. The corresponding enable signals, which would have preceded signals 104 and/or 106 in a continuous transmission, i.e., if the preceding lines were present, are represented by dashed lines 109 and 110. After transmission of all image lines of an image, a vertical synchronization signal (not shown in FIG. 4) is output to display units 11, 12 and the next image is output with the next image line, e.g., beginning with the first line.

In one specific embodiment, the data transmission from control unit 30 to processing unit 50 takes place via an LVDS interface in which voltage difference signals are transmitted. In this way, the electromagnetic radiation emission is minimized. Processing unit 50 and control unit 30 may be situated on a shared circuit board in one embodiment in such a way that both control unit 30 and processing unit 50 are each designed as a separate integrated circuit. In a preferred embodiment, at least one of display units 11, 12 is connected to processing unit 50 via an LVDS interface. Processing unit 50 is preferably designed as an FPGA (field programmable gate array). The units implemented in processing unit 50 in FIG. 2 are thus not implemented in discrete hardware but instead are simulated by hardware of the FPGA. In another embodiment, the circuit shown in FIG. 2 may also be implemented by an ASIC instead of an FPGA. In an implementation by an FPGA, however, the existing structure may easily be adapted to other display applications.

FIG. 2 shows as an example the output of two different images on two display units. By adding an additional memory to memories 61 and 62, a corresponding additional data output and a modification of the switch to switching between three display units and an expansion of image memory 32 by the content of a third display unit, a third display unit may be connected to processing unit 50. Accordingly, other display units may also be added, the embodiment of the processing unit being adapted accordingly.

In another specific embodiment, it is also possible for display units 11, 12 to have different numbers of lines, for example. If display unit 12 occupies only an area 120, for example, then only the image data corresponding to area 121 of second image 42 need also be read out. Until reaching the last line of second image 42 the image data output is unchanged according to the example given above. Pause characters (blanks) are transmitted to the display unit until the next image is pending for output. The data transmission thus takes place with no change in speed.

In another specific embodiment, the frequencies for the output of image data to the particular display units may also differ. In this case the only condition to be met is that during the period of time when an image line for both display units is being transmitted, it is also possible to read out both image lines, and the number of pixels must be in a corresponding ratio to the rate of output of pixels to a corresponding display unit. For example if pixel data are output to the second display unit at a rate slower by one-third than to the first display unit, then one-third fewer pixels may be output per line to the corresponding display unit.

What is claimed is:
1. A device for outputting different images on at least two display units, comprising:
 a control unit configured to:
  read out image data of the different images from an image memory;
  generate a horizontal synchronization signal; and output the image data and the horizontal synchronization signal; and
 a processing unit configured to:
  a) receive the image data and the horizontal synchronization signal;
  b) generate at least one additional synchronization signal for at least one of the two display units as a function of at least the horizontal synchronization signal supplied by the control unit and a clock signal; and
  c) divide the image data transmitted by the control unit in such a way that the image data of the different images are respectively output to the two display units;
 wherein the processing unit includes a memory and an interface that is connected to the memory, wherein the output parameters of the at least two display units are stored in the memory, and wherein a frequency for outputting the image data to at least one display unit via the interface is stored in the memory for influencing the frequency for outputting the image data, and wherein the device is configured to output at least two different images on at least two display units, and include the image memory in which the at least two different images are stored side by side to form an image data, and wherein the two different images are read out line by line such that a line of a second image is read out after a line of a first image has been read out.

2. The device as recited in claim 1, wherein the horizontal synchronization signal is configured to initiate a start of an image line made up of pixels, the image line being formed from a line of each of the different images.

3. The device as recited in claim 1, wherein the at least two different images are stored next to each other in the image memory.

4. The device as recited in claim 1, wherein the processing unit is configure to generate the at least one additional synchronization signal for each of the two display units, and wherein the at least one additional synchronization signal includes at least one of an additional horizontal synchronization signal, a vertical synchronization signal, an enable signal, and a clock signal.

5. The device as recited in claim 1, wherein the processing unit has two memories for storing the image data of the different images for the at least two display units, and the two memories of the processing unit are configured to each store no more than data for one image line.

6. The device as recited in claim 1, wherein the processing unit is connected by an LVDS link to at least one of: a) the control unit; and b) at least one of the two display units.

7. The device as recited in claim 1, wherein the processing unit is configured as an FPGA.

8. The device as recited in claim 1, wherein the horizontal synchronization signal is configured to initiate a start of an image line made up of pixels, the image line being formed from a line of each of the different images, and wherein the at least two different images are stored next to each other in the image memory.

9. The device as recited in claim 1, wherein the processing unit is configure to generate the at least one additional synchronization signal for each of the two display units, and wherein the at least one additional synchronization signal includes at least one of an additional horizontal synchronization signal, a vertical synchronization signal, an enable signal, and a clock signal, and wherein the processing unit has two memories for storing the image data of the different images for the at least two display units, and the two memories of the processing unit are configured to each store no more than data for one image line.

10. The device as recited in claim 1, wherein the processing unit is connected by an LVDS link to at least one of: a) the control unit; and b) at least one of the two display units, and wherein the processing unit is configured as an FPGA.

11. A method for outputting different images on at least two display units, comprising:
   reading out, by a control unit, image data of the different images from an image memory;
   generating, by the control unit, a first horizontal synchronization signal;
   outputting, by the control unit, the first horizontal synchronization signal and the image data to a processing unit;
   generating, by the processing unit, additional synchronization signals for the at least two display units as a function of the first horizontal synchronization signal supplied by the control unit and a clock signal; and
   dividing, by the processing unit, the image data transmitted by the control unit in such a way that the image data of the different images are respectively output to the two display units,
   wherein the processing unit includes a memory and an interface that is connected to the memory, wherein the output parameters of the at least two display units are stored in the memory, and wherein a frequency for outputting the image data to at least one display unit via the interface is stored in the memory for influencing the frequency for outputting the image data, and
   wherein the device is configured to output at least two different images on at least two display units, and include the image memory in which the at least two different images are stored side by side to form an image data, and wherein the two different images are read out line by line such that a line of a second image is read out after a line of a first image has been read out.

12. The method as recited in claim 11, wherein: the image data are output by the control unit to the processing unit at a first frequency; and the image data are buffered at least partially by the processing unit and are output to the two display units at frequencies respectively assigned to the two display units, the frequencies respectively assigned to the two display units being lower than the first frequency.

13. The method as recited in claim 12, wherein the frequencies respectively assigned to the display units are selected in such a way that a time available for outputting one image line of the different images is the time during which one image line of the different images is transmitted to the processing unit.

14. The method as recited in claim 11, wherein the image data of the different images are read out from the image memory line by line in an alternating manner such that one image line of one image is read out after an image line of a different image is read out.

* * * * *

UNITED STATES PATENT AND TRADEMARK OFFICE
CERTIFICATE OF CORRECTION

PATENT NO. : 8,477,080 B2  Page 1 of 1
APPLICATION NO. : 12/224076
DATED : July 2, 2013
INVENTOR(S) : Lindner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1204 days.

Signed and Sealed this
Eighth Day of September, 2015

Michelle K. Lee
*Director of the United States Patent and Trademark Office*